Figure 1:
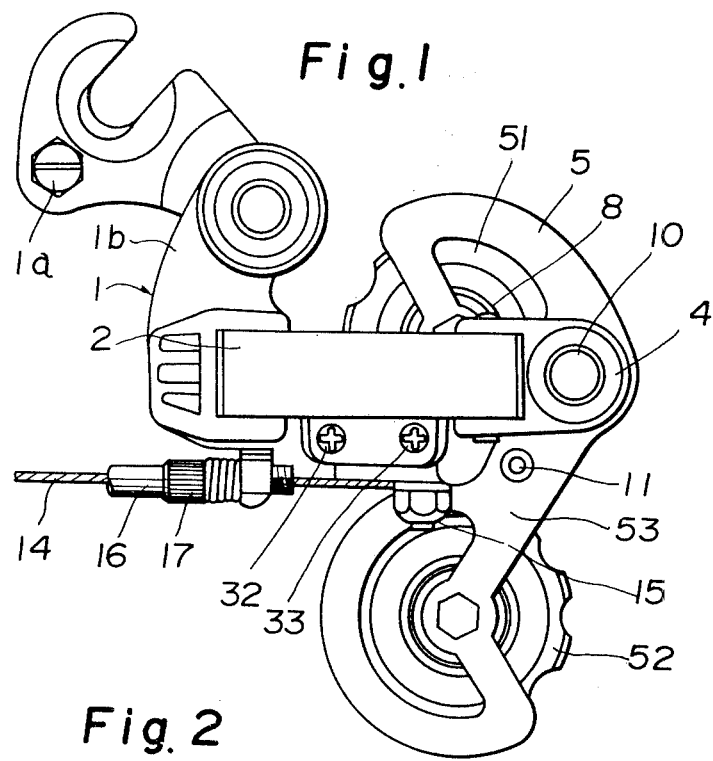

United States Patent [19]

Nagano et al.

[11] 4,259,873
[45] Apr. 7, 1981

[54] DERAILLEUR

[75] Inventors: Masashi Nagano, Sakai; Mitsuhide Isobe, Toyonaka, both of Japan

[73] Assignee: Shimano Industrial Company Limited, Osaka, Japan

[21] Appl. No.: 43,682

[22] Filed: May 30, 1979

[30] Foreign Application Priority Data

Jun. 2, 1978 [JP] Japan .............................. 53-75921[U]
Dec. 9, 1978 [JP] Japan ........................... 53-170080[U]

[51] Int. Cl.³ ............................................. F16H 11/00
[52] U.S. Cl. ..................................................... 474/82
[58] Field of Search ....................................... 74/217 B

[56] References Cited

U.S. PATENT DOCUMENTS 3,974,707  8/1976  Nagano .............................. 74/217 B
4,132,119  1/1979  Nagano et al. ..................... 74/217 B Primary Examiner—C. J. Husar
Assistant Examiner—Conrad Berman
Attorney, Agent, or Firm—Stevens, Davis, Miller & Mosher

[57] ABSTRACT

A derailleur in which a movable member is freely movable in its forward movement in a given range with respect to a base member without being subjected to action of a return spring, whereby when a control wire is pulled by a control lever, the stroke of the pull-operation, over the free rotation range, allows the movable member to move forward and the movable member, at the terminus of its forward movement, is movable forward freely within the given range such that it may be pulled by the tension of a bicycle chain engaging with a sprocket to complete a partially completed shifting operation.

9 Claims, 12 Drawing Figures

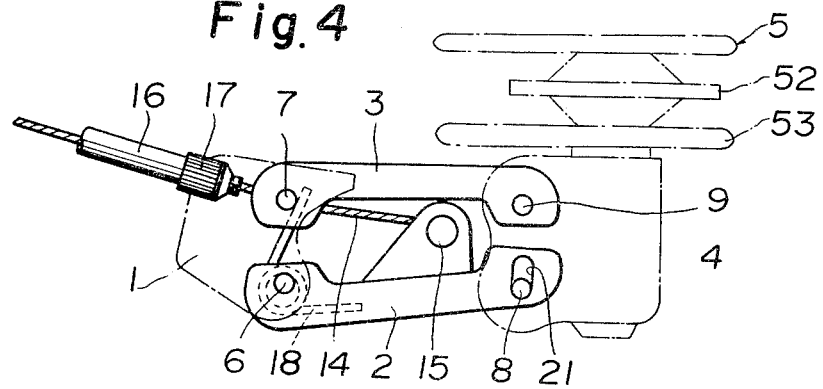
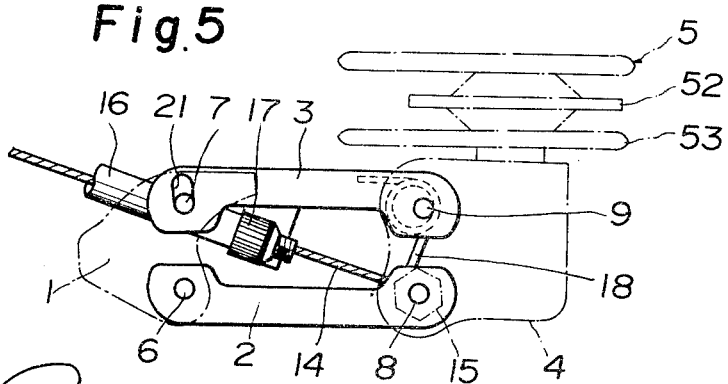
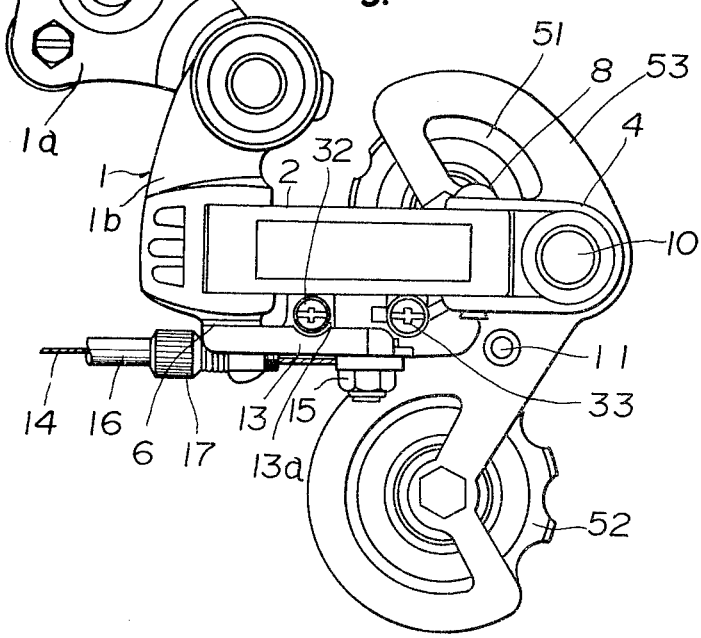

DERAILLEUR

This invention relates to a derailleur mainly for a bicycle, and more particularly to a derailleur in which a base member, two link members and a movable member with a chain guide, constitute a four member linkage mechanism, the movable member being operated through a control wire and moed in reciprocation with respect to the base member for changing the bicycle speed.

Generally, this kind of derailleur is adapted to change the bicycle speed in such a manner that the pull operation of the control wire and the action of a return spring allow the movable member to move with respect to the base member through parallelogrammic transformation of four member linkage mechanism so that a driving chain guided by the chain guide is moved axially of a multi-stage sprocket to be switched to a selected sprocket.

For changing bicycle speed, when the control wire is pulled against the return spring to switch the chain, especially, from a smaller diameter sprocket to a larger diameter sprocket, a cyclist occasionally operates the lever in slow motion or in a short lever-stroke, whereby the chain, when guided, contacts with the sprocket to which it is being switched causing noise or causing unexpected wear of the sprocket and chain.

Accordingly, it has hitherto been desired to automatically switch the chain to a selected sprocket without continuous contact of the two even with a slow shifting operation or a short stroke of the wire control. However, to fulfill this function, the derailleur must have a complicated construction.

This invention has been designed to overcome this problem. An object of the invention is to provide a derailleur which is simple in construction and capable of ensuring the chain's switching to the desired sprocket even when the control wire is not properly operated.

The derailleur of the invention is constructed such that the movable member is not subject to action of the return spring and is movable in reciprocation freely in a given range so that when the control wire is pulled for changing the speed the stroke of pull operation, over the given free rotation range, allows the movable member to move forward and then the movable member, at the terminus of its forward movement, is further movable forward in the given free rotation range.

In other words, the invention utilizes the tension of the driving chain which is brought into contact with the sprocket before switching thereto when the control wire is improperly operated, thereby forcing the movable member at the derailleur to move to switch the chain to the sprocket.

In detail, this invention is characterized in that the movable member is made movable freely in a given range with respect to the base member without being subjected to the action of the return spring and even when the control wire is not properly pulled, the chain carried by a chain guide at the movable member is, when brought into contact with the sprocket, automatically switched thereto by use of the tension of the same. In this invention, the construction of the movable member to enable its free movement in a given range with respect to the base member may take many forms, several examples of this construction are disclosed below.

First, one of two link members constituting the four member linkage mechanism carries the control wire or outer sheath guiding the wire, and the one link member is, at its one end, subjected to the action of return spring and is, at the other end, made movable in a given range with respect to the base member or movable member. Second, the four member linkage mechanism carries an arm swingable in a given range with respect thereto, the arm carries the control wire or outer sheath, and the return spring is inserted between the arm and the four members linkage mechanism.

In either case, the movable member is not subjected to the action of the return spring and is movable in free reciprocation in a given range with respect to the base member, thereby achieving the aforesaid object.

Figure 2:
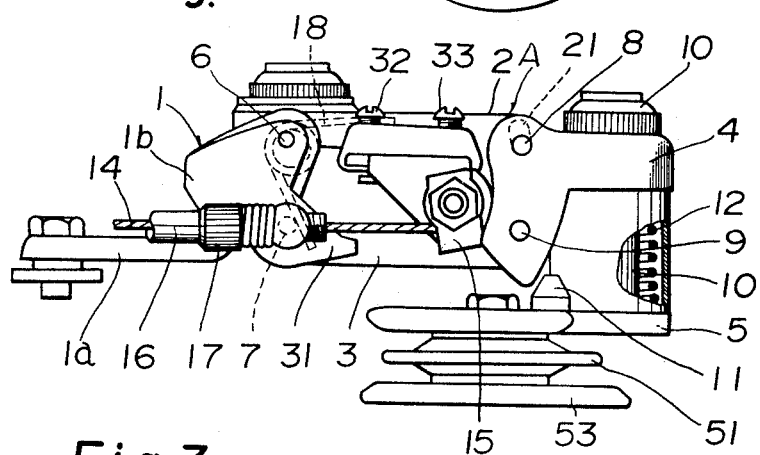
Figure 3:
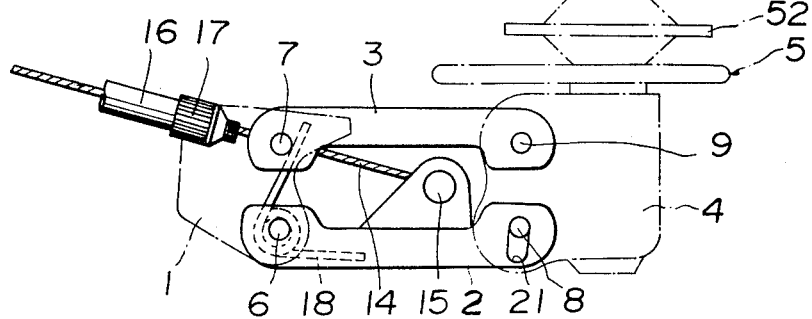
Figure 7:
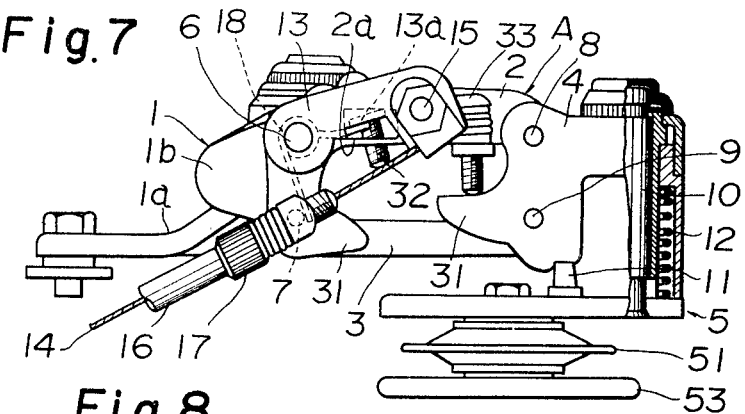
Figure 8:
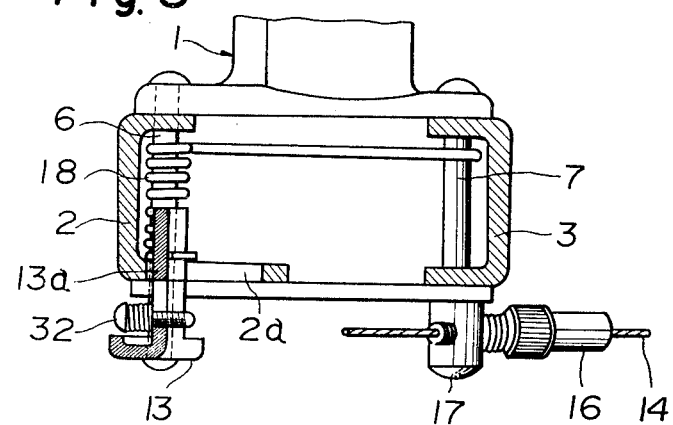

These and other objects and novel features of the invention will be more apparent from the description of preferred embodiments thereof taken in accordance with the accompanying drawings, in which:

FIG. 1 is a side view of a first typical embodiment of the derailleur of the invention, FIG. 2 is a bottom view thereof, FIGS. 3 and 4 are schematic diagrammatic views explanatory of operation of the derailleur in FIG. 1, FIG. 5 is a schematic diagrammatic view explanatory of a modification of the above embodiment, FIG. 6 is a side view of a second typical embodiment of the invention, FIG. 7 is a bottom view thereof, FIG. 8 is an enlarged sectional view of the principal portion of the same, and FIGS. 9 through 12 are schematic diagrammatic views explanatory of operation of the derailleur in FIG. 6.

The first typical embodiment of the derailleur of the invention will be described in accordance with FIGS. 1 through 4.

Referring to the drawings, a rear derailleur is shown which is provided with a four member linkage mechanism A formed of a base member 1, first and second link members 2 and 3, and a movable member 4 having a chain guide 5.

The base member 1 comprises a bracket 1a fixed to the bicycle frame or seat stay and a support 1b mounted rotatably only in a given range with respect to the bracket 1a. The first and second link members are each pivoted at one end thereof to the support 1b through pins 6 and 7.

The first and second link members 2 and 3 are in parallel with each and pivoted to the movable member 4 through pins 8 and 9 respectively. The first and second link members 2 and 3 swing to allow the movable member 4 to move, as a part of a parallelogram, with respect to the base member 1 between the high speed stage as shown in FIG. 2 and the low speed stage.

The chain guide 5 mounted to the movable member 4 comprises two pulleys 51 and 52 and change-over frame 53 supported rotatably to the movable member 4 around a pivot 10. The changeover frame 53 rotates a limited amount in a range restricted by a stopper 11 and is biased toward the stopper 11 by a spring 12 wound around the pivot 10. The spring 12 serves to apply tension to a driving chain guided by the pulleys 51 and 52 at the chain guide 5.

In the derailleur described, a control wire 14 is secured to a first link member 2 of the two link members through a holder 15, an outer sheath 16 guiding the wire 14 is supported to the base member 1 through a support 17, a return spring 18 is wound around a pin 6 pivotally supporting therewith the first link member 2 to the base member 1, the return spring 18 is seated at on end thereof to the pin 7 and at the other end biases the first link member 2 at a side of base member 1, and the first link member 2 is provided at one end thereof at a side of the movable member 4 with a slot 21 through which the pin 8 projects, thereby allowing the first link member 2 to move only in a given range with respect to the movable member 4.

In addition, in FIGS. 1 and 2, reference numeral 31 designates a stopper, and 32 and 33 designate adjustment screws.

Next, the function of the FIGS. 1-4 derailleur constructed as described above will be described.

Referring to FIGS. 2 and 3, the movable member 4 is shown when in its high speed stage. The control wire under this condition is pulled to allow the first link member 2 only to swing within the range defined by length of the slot 21. By the pull-operation of the control wire within this range, the movable member 4 is not moved but the swinging motion of first link member 2 disconnects the return spring 18 from the movable member 4. As a result, the movable member 4 becomes movable with respect to the link members 2 and 3 within the range defined by the slot 21.

Under these conditions, when the wire 14 is further pulled the edge of slot 21 reaches the pin 8 and thereafter the movable member 4 moves forward following the swinging motion of link members 2 and 3, whereby the chain guided by the pulleys 51 and 52 moves toward the sprocket to contact and mesh therewith.

At this time, if the pull-operation of the wire ceased and the chain were being switched by a conventional derailleur, it would be kept in contact with the sprocket making noise. On the other hand, in the derailleur of the invention, the movable member 4, when the chain is kept in contact with the sprocket, has a free forward movement. Therefore, even when control wire operation ceases, the tension of chain acts on the movable member 4 simultaneously with the chain's contact with the sprocket, whereby the movable member 4 is allowed to move correspondingly within the movable range defined by the slot 21, thus switching the chain to the desired sprocket.

In the just described construction, the wire 14 may be secured to the second link member 3 in place of the first link member 2.

As an alternative, the outer sheath 16 may be supported to the second link member 3 as shown in FIG. 5, where the wire 14 is secured to the movable member 4. The return spring 18 is wound around the pin 9 and retained at one end to the pin 8 and, at the other end, biases the second link member 3. Also, pin 7 projects through slot 21.

The slot 21, other than being formed at the first link member 2, may also be formed at the movable member 4 or base member 1. In addition, it is to be noted that the movable range of the link member through the slot 21 is defined to a sufficient extent to permit the chain to ride on the sprocket and be meshed after contacting therewith.

Next, the second embodiment of the invention will be explained in accordance with FIGS. 6 through 12.

The second embodiment is not different from the first embodiment in its fundamental construction and the same members are designated by identical reference numerals.

The difference between the second embodiment and the first is that in the former an arm 13 is provided separately from the four member linkage mechanism. The arm 13 is pivoted to the linkage mechanism and freely rotatable in a given range with respect thereto. The control wire 14 or outer sheath 16 is supported to the arm 13, and the arm 13 also is subjected to the action of the return spring 18.

Referring to FIGS. 6 through 12, the arm 13, having an engaging projection or tongue 13a, is fixed to the pin 6 and pivotally supported together therewith to the base member 1, and a slot 2a is provided at the first link member 2 and is engaged with the engaging tongue 13a, whereby the arm 13 is made swingable only in a given range with respect to the first link member 2. To the arm 13 is secured the control wire 14 through a holder 15, to the movable member 4 is held the outer sheath 16 through a support 17, and a return spring 18 is inserted between the arm 13 and the pin 6.

Figure 9:
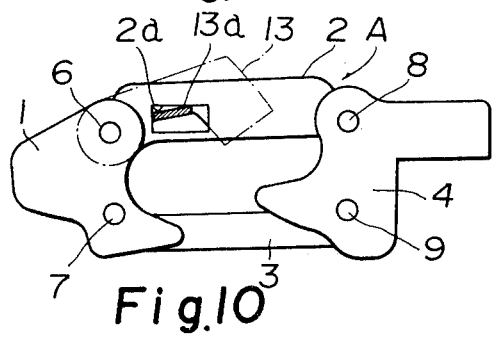
Figure 10:
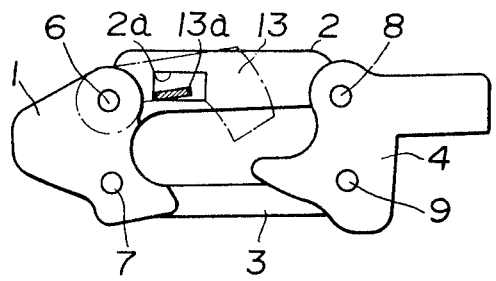

Next, operation of the second derailleur embodiment will be described. Referring to FIGS. 7 and 9, the movable member 4 at the high speed stage is shown.

Figure 11:
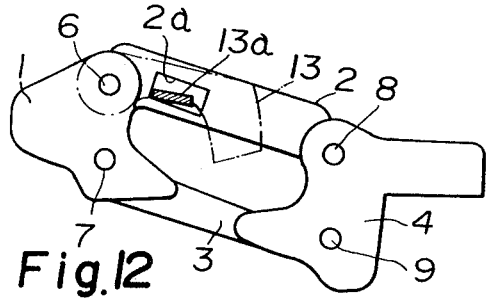
Figure 12:
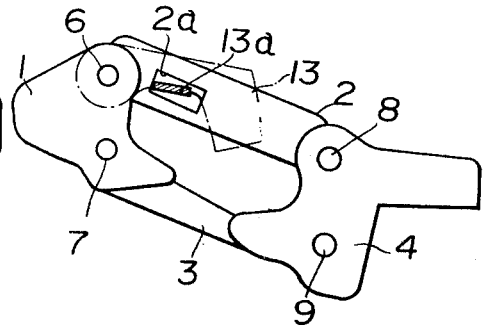

The swinging motion of arm 13 allows the first and second link members 2 and 3 and movable member 4 to be movable freely with respect to the base member 1. After the swinging motion of arm 13, when the wire 14 is further pulled, the arm 13 swings in excess of the range defined by the slot 2a, thereby allowing the movable member 4 to move forward following the arm 13 as shown in FIG. 11.

Therefore, the chain is guided by the pulleys 51 and 52 to move toward the sprocket to mesh and contact therewith. At this time, the pull operation of wire 14 ceases, the first and second link members 2 and 3 and movable member 4 are free with respect to the base member 1, whereby at the same time as the chain contacts with the sprocket to mesh therewith, the movable member 4 is subjected to the action of the chain tension and moves to an extent corresponding to the range of the swinging motion of arm 13 defined by the slot 2a, thereby properly switching the chain to the desired sprocket.

As an alternative arrangement, the arm 13 may be supported to the link members 2 and 3 by use of another pin in place of the pin 6, or it may be supported to the base member 1 or movable member 4.

The arm 13 may also carry the outer sheath 16 rather than the control wire 14.

The engaging tongue 13a provided at the arm 13 may be integrated therewith or mounted thereto through projection means, such as a separate pin.

The range of swinging motion of arm 13, rather than being defined by the length of slot 2a may be defined by two stoppers which are provided at the first link member 2 and are spaced at a regular interval, within which the engaging tongue 13a or other projection means is inserted; or by two stoppers which are each provided at the arm 13 and first link member 2 and are regularly spaced. As another alternative, the arm 13 may be provided with the slot or stoppers and the link member 2 may be provided with the projection means. The range of swinging motion of arm 13 is not limited to be set at the link member 2, but may be set at the movable member 4.

The range of swinging motion of the arm 13 is enough to allow the chain to ride on the desired sprocket after contacting therewith.

In the first and second embodiments, the control lever is composed of a body for winding therewith the control wire 14 and a resistor for applying to the lever body friction overcoming the strength of return spring 18. The resistor is applied with rotational resistance overcoming the strength of return spring 18, the lever body is supported on the lever shaft in relation of being freely rotatable, and the lever body is associated with the resistor and made rotatable freely in a given range with respect thereto. As a result, even when the lever is overshifted during the pull-operation of wire, the lever body returns within the freely rotatable range at the same time as the input to the lever body is lost, whereby the link members 2 and 3 and movable member 4 are allowed to return toward the high speed stage to an extent corresponding to this range. Accordingly, the chain is properly meshed with the desired sprocket even without the control of the lever to return from an overshifted position. Hence, the lever control is combined with the derailleur of the invention so that a speed change device emitting less noise may be obtained.

Although the first and second embodiments have been described with respect to a rear derailleur, the invention is, of course, also applicable to a front derailleur.

As clearly understood from the aforesaid description, the derailleur of the invention, when switching the chain especially from a smaller diameter sprocket to a larger diameter sprocket, is capable of permitting movement of the moveable member by the tension applied to the chain in contact with the sprocket thereby allowing the chain to be meshed with the sprocket even when the shift lever is slowly operated or its operation ceases before the chain is switched, thereby properly switching the chain to the desired sprocket.

As a result, the derailleur, even though of simple construction, prevents the chain from being kept in contact with the sprocket when the control wire is improperly operated as described above, thereby eliminating noise caused by contact of the chain with the sprocket.

While preferred embodiments of the invention have been described using specific terms, such description is for illustration purpose only, and it is to be understood that changes and variations may be made without departing from the spirit or scope of the invention which is defined in the following claims.

What is claimed is:

1. A derailleur for switching a driving chain to one of a plurality of multi-stage sprockets by operation of a control wire comprising:
   a four member linkage mechanism comprising a base member, first and second link members supported swingably to said base member, and a movable member supported to said link members in relation of being movable in forward and return reciprocation with respect to said base member, said movable member carrying a chain guide; and
   A return spring for biasing said movable member in said return movement direction;
   said movable member being movable forward with respect to said base member when said control wire is pulled against said return spring, being movable in return by said return spring with respect to said base member when said control wire is released, and being capable of free reciprocal movement in a given range with respect to said base member without being subjected to the action of said return spring, so that when said control wire is operated in its pull direction, after the pull-stroke of said wire exceeds the range of free movement of said movable member, said movable member is moved forward and at the terminus of said forward movement said movable member is made freely movable in a given range in the forward movement direction.

2. A derailleur as set forth in claim 1, wherein one of the said first and second link members at said four member linkage mechanism is made movable at one end side of said one linkage member in a given range with respect to one of said base member and movable member, said return spring is inserted between the other end side of said one linkage member and the other of said base member and movable member, and at said one linkage member is supported one of said control wire and an outer sheath guiding said control wire.

3. A derailleur as set forth in claim 2, wherein a slot is provided at either one of said first and second link members or one of said base member and movable member pivoted to said one link member, and a pin is inserted through said slot through which said one link member is pivotally supported to one of said base member and movable member, so that said link member is made movable at a side of one end thereof in a given range with respect to one of said base member and movable member.

4. A derailleur as set forth in claim 2, wherein one of said first and second link members includes a first end portion connected to said movable member and a second end portion connected to said base member, said first end portion being made movable in a given range with respect to said movable member, said second end portion being subjected to the action of said return spring.

5. A derailleur as set forth in claim 2, wherein one of said first and second link members includes a first end portion connected to said base member and a second end portion connected to said movable member, said first end portion being made movable in a given range with respect to said base member, said second end portion being subjected to the action of said return spring.

6. A derailleur as set forth in claim 1, wherein an arm is provided separately from said four member linkage mechanism, said arm is pivoted to said four member linkage mechanism to be movable in association therewith in a given range with respect to said four member linkage mechanism, one of said control wire and an outer sheath guiding said wire is supported to said arm, and said return spring is inserted between said arm and said four member linkage mechanism.

7. A derailleur as set forth in claim 6, wherein said arm is made movable in a given range in association with one of said first and second link members.

8. A derailleur as set forth in claim 7, wherein said arm is provided with an engaging body, said engaging body being adapted to be engaged with one of said first and second link members and be movable in association therewith, and between said engaging body and one of said first and second link members is provided a gap through which said arm is freely movable.

9. A derailleur as set forth in claim 8, wherein a slot is forming at one of said first and second link members in association with said engaging body at said arm, so that said engaging body may be engaged with said slot.

* * * * *